(12) United States Patent
Kolpasky et al.

(10) Patent No.: US 7,086,656 B2
(45) Date of Patent: Aug. 8, 2006

(54) EXTENDABLE VEHICLE STEP ASSEMBLY

(75) Inventors: Kevin G. Kolpasky, Sterling Heights, MI (US); Pradip V. Shah, Rochester Hills, MI (US)

(73) Assignee: General Motors Corporation, Detroit, MI (US)

( * ) Notice: Subject to any disclaimer, the term of this patent is extended or adjusted under 35 U.S.C. 154(b) by 58 days.

(21) Appl. No.: 10/780,487

(22) Filed: Feb. 17, 2004

(65) Prior Publication Data

US 2005/0179226 A1 Aug. 18, 2005

(51) Int. Cl.
*B60R 19/42* (2006.01)

(52) U.S. Cl. .................. 280/164.1; 280/166; 296/198; 296/293; 296/75; 296/37.6; 296/62

(58) Field of Classification Search ............. 280/164.1, 280/166; 296/198, 293, 75, 37.6, 62
See application file for complete search history.

(56) References Cited

U.S. PATENT DOCUMENTS

| | | | |
|---|---|---|---|
| 1,458,519 A | 6/1923 | Calhoun | |
| 1,619,451 A | 3/1927 | Weymouth | |
| 1,753,483 A | 4/1930 | Stevens | |
| 3,718,357 A * | 2/1973 | Hertzell | 293/9 |
| 3,888,510 A | 6/1975 | Maske | 280/166 |
| 5,333,923 A * | 8/1994 | Whitfield | 293/128 |
| 5,697,626 A | 12/1997 | McDaniel et al. | 280/166 |
| 5,897,125 A | 4/1999 | Bundy | 280/166 |
| 6,135,472 A | 10/2000 | Wilson et al. | 280/166 |
| 6,179,354 B1 | 1/2001 | Bennett, Jr. | 293/128 |
| 6,203,040 B1 | 3/2001 | Hutchins | 280/169 |
| 6,375,207 B1 | 4/2002 | Dean et al. | 280/166 |
| 6,406,045 B1 * | 6/2002 | Farkash | 280/164.1 |

* cited by examiner

*Primary Examiner*—J. Allen Shriver
*Assistant Examiner*—Cynthia F. Collado
(74) *Attorney, Agent, or Firm*—Kathryn A. Marra

(57) ABSTRACT

A step assembly for a vehicle includes a base member and at least one movable member. The base member and the at least one movable member each define a stepping surface on which a vehicle user may elevate himself. The movable member is repositionable with respect to the base member to selectively alter the length of the step assembly.

15 Claims, 2 Drawing Sheets

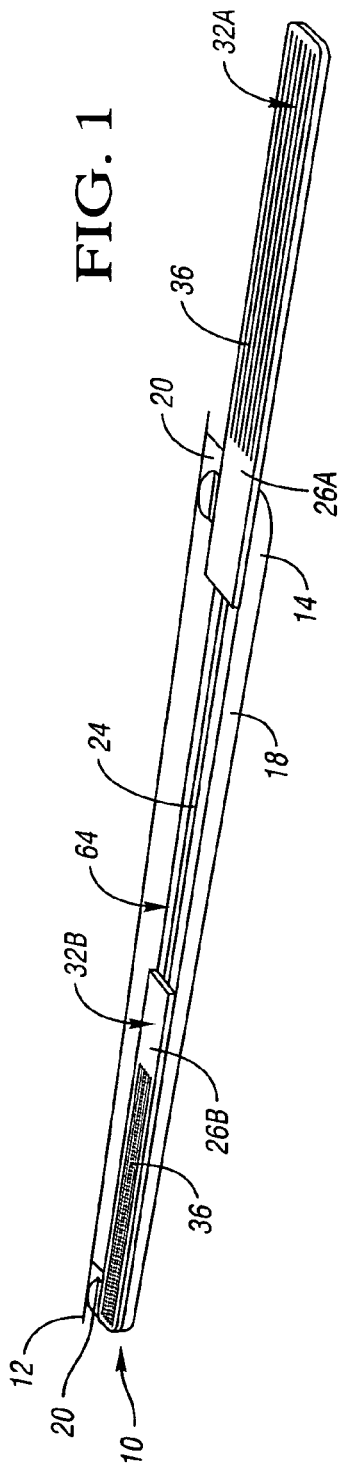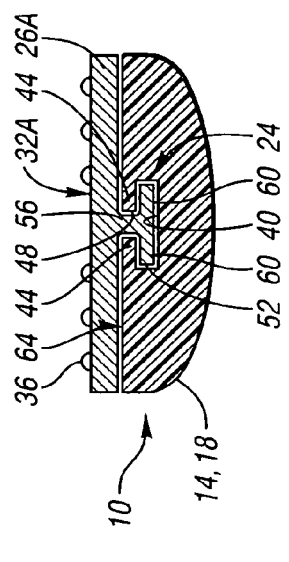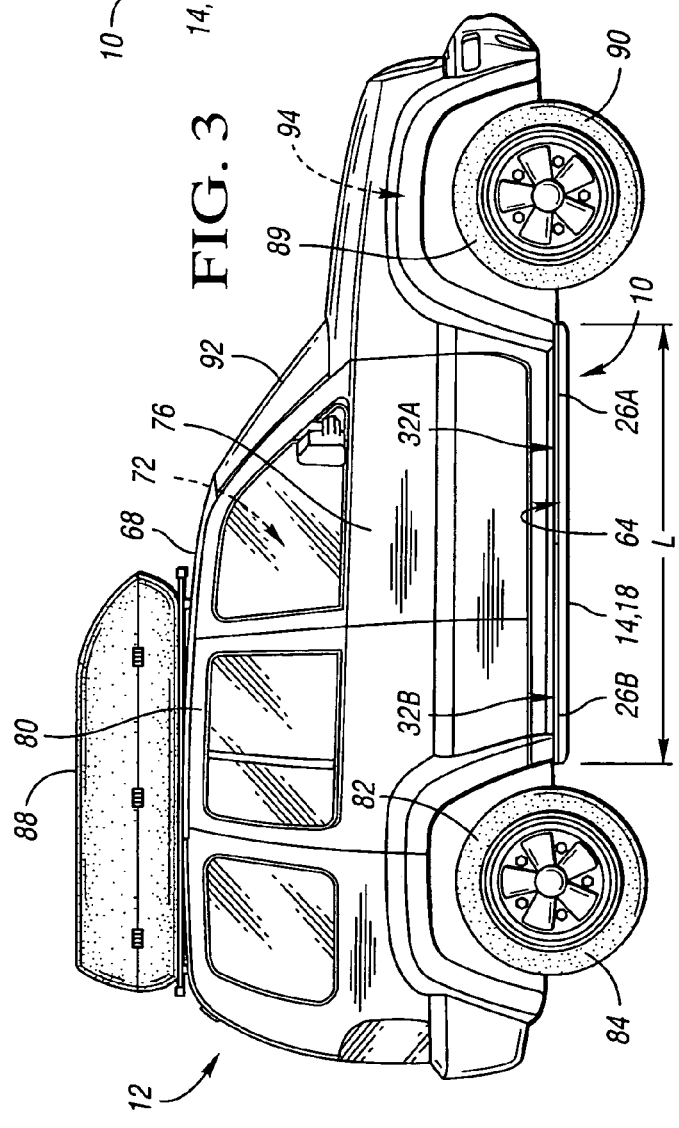

US 7,086,656 B2

EXTENDABLE VEHICLE STEP ASSEMBLY

TECHNICAL FIELD

This invention relates to vehicle steps that are selectively variable in length.

BACKGROUND OF THE INVENTION

Certain vehicles, especially pickup trucks and sport utility vehicles, have passenger compartments that are situated relatively high off the ground. The prior art includes running boards, tubular bars, etc., that provide a stepping surface between the ground and the passenger compartment to facilitate access to the passenger compartment. Prior art steps have a fixed length, and do not extend significantly forward or rearward of a vehicle's side doors.

Prior art vehicle steps thus facilitate entry into a passenger compartment. However, vehicle users often must access other parts of the vehicle that are located high off the ground and may therefore be difficult to reach. For example, a vehicle user may have difficulty cleaning the windshield, reaching into the engine compartment, reaching into a pickup truck cargo box, or placing cargo on the roof of certain vehicles.

Some prior art running boards are movable to a stowed position in which the running board is moved inboard or upward with respect to the vehicle body to reduce the overall width of the vehicle or to increase ground clearance.

SUMMARY OF THE INVENTION

A step assembly for a vehicle includes a base member mountable with respect to the vehicle and having a base member stepping surface, i.e., a surface on which a vehicle user may step to elevate himself or herself. The step assembly also includes at least one movable member having a movable member stepping surface. The at least one movable member is selectively repositionable with respect to the base member such that the length of the step assembly is selectively variable.

The step assembly of the invention improves upon the prior art by enabling selective fore/aft placement of a surface suitable for stepping. For example, the movable member may be movable between a stowed position in which the step assembly is characterized by a compact length, and an extended position in which at least a portion of the stepping surface is situated rearward of at least a portion of a rear wheel or forward of at least a portion of a front wheel. Thus, a stepping surface may be provided forward or rearward of vehicle door openings to facilitate access to a roof, a pickup truck cargo box, an engine compartment, a windshield, etc., and stowed when not used to avoid interference with wheels or for aesthetic reasons.

The above features and advantages, and other features and advantages, of the present invention are readily apparent from the following detailed description of the best modes for carrying out the invention when taken in connection with the accompanying drawings.

BRIEF DESCRIPTION OF THE DRAWINGS

FIG. 1 is a schematic perspective view of a step assembly according to the claimed invention;

FIG. 2 is a schematic cross sectional view of the step assembly of FIG. 1 taken along a vertical plane;

FIG. 3 is a schematic side view of the step assembly mounted to a vehicle body with movable members in stowed positions;

DESCRIPTION OF THE PREFERRED EMBODIMENTS

Figure 5:
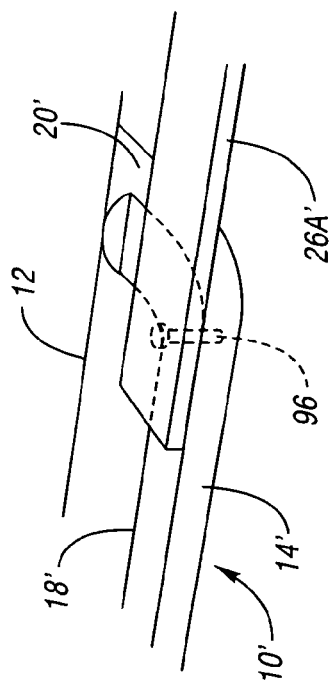
FIG. 5 is a schematic view of a portion of a step assembly having an alternative configuration.

Referring to FIG. 1, a step assembly 10 for a vehicle is schematically depicted. The step assembly 10 includes a base member 14 having an elongated portion 18 and two cantilever portions 20 generally perpendicular to the elongated portion 18 and spaced a distance apart from one another. The cantilever portions 20 are mounted to a vehicle 12 to support the elongated portion 18 above the ground. Those skilled in the art will recognize a variety of mounting methods that may be employed within the scope of the claimed invention, such as welding, mechanical fasteners, etc. Alternatively, the base member 14 may be integrally formed as part of a vehicle body or vehicle frame. Accordingly, in the context of the claimed invention, a base member that is "mounted" or "mountable" with respect to a vehicle may or may not be integrally formed as part of a vehicle body or vehicle frame. The base member is characterized by upper surface 64 that functions as a base member stepping surface, as discussed below. A track 24 on the base member 14 extends the length of the elongated portion 18.

The step assembly 10 also includes two movable elongated members 26A, 26B. Each movable member 26A, 26B has a length that is approximately one half the length of the elongated portion 18, and a width approximately equal to the width of the elongated portion 18. The base member 14 and the movable members 26A, 26B are preferably formed of a light, strong material such as aluminum. Those skilled in the art will recognize a variety of forming techniques that may be employed to produce the base member 14 and the movable members 26A, 26B, such as molding, casting, extrusion, etc.

Each movable member 26A, 26B has a movable member stepping surface 32A, 32B, i.e., a surface configured to form a step on which a vehicle user may elevate himself. In the preferred embodiment, the movable member stepping surfaces are substantially flat and horizontally-oriented. The movable member stepping surfaces 32A, 32B may include ribs 36 or other surface features to provide traction for a vehicle user's foot. The movable member stepping surfaces 32A, 32B may or may not be at least partially defined by a non-skid material, such as rubber or plastic. In the embodiment depicted, the ribs 36 are rubber or plastic strips that are mounted to the movable members by adhesive bonding or mechanical fasteners.

The movable members 26A, 26B are engaged with the track 24 to enable selective translation of the movable members 26A, 26B fore and aft with respect to the vehicle 12. Referring to FIG. 2, wherein like reference numbers refer to like components from FIG. 1, the track 24 includes a channel 40 formed in the base member 14. The channel 40 is partially defined by two opposing flanges 44 having a gap 48 therebetween.

Movable member 26A includes a slider rail 52 formed on its underside. Movable member 26B, which is not depicted in FIG. 2, has a substantially identical cross section and slider rail. Optionally, the slider rails 52 may be separate pieces attached to the undersides of the movable members. Each slider rail 52 includes a vertically-oriented portion 56 that extends through the gap 48, and two horizontally-oriented flanges 60 that occupy at least a portion of the channel 40. The track 24 is configured such that the motion of the movable member 26A is limited to fore/aft translation; physical part interference between the track 24 and the slider rail 52 limits the motion of the movable member 26A with respect to the base member 14 and prevents separation of the movable member 26A from the base member 14.

In the embodiment depicted, the movable members 26A are located above the base member 14 and cover at least a portion of the upper surface 64 of the base member. However, other configurations and techniques for enabling fore/aft translation of a movable member may be employed within the scope of the claimed invention. For example, the elongated portion of the base member may be hollow and have an opening at each end to form a track that guides a movable member in translation fore and aft; the movable members may telescope in and out of the base member through one of the openings in the base member. Such a configuration may be preferable if the base member and movable members are cylindrical tubes.

Referring to FIG. 3, wherein like reference numbers refer to like components from FIGS. 1 and 2, the vehicle 12 includes a body 68 supported off the ground. The vehicle body 68 depicted has a sport-utility vehicle configuration. Those skilled in the art will recognize other body configurations that may be employed within the scope of the claimed invention, such as pickup trucks, RVs, etc. The body 68 defines a passenger compartment 72 accessible via a front side door 76 and a rear side door 80. The step assembly 10 is situated at a height between the ground and the front and rear doors 76, 80. The elongated portion 18 of the base member does not extend significantly forward of the front door 76, and does not extend significantly rearward of the rear door 80. The movable members 26A, 26B are each depicted in a respective stowed position, such that the movable members 26A, 26B are adjacent one another at the midsection of the elongated portion 18 of the base member 14 and cover substantially all of surface 64. The step assembly 10 is characterized by a first length L.

Figure 4:
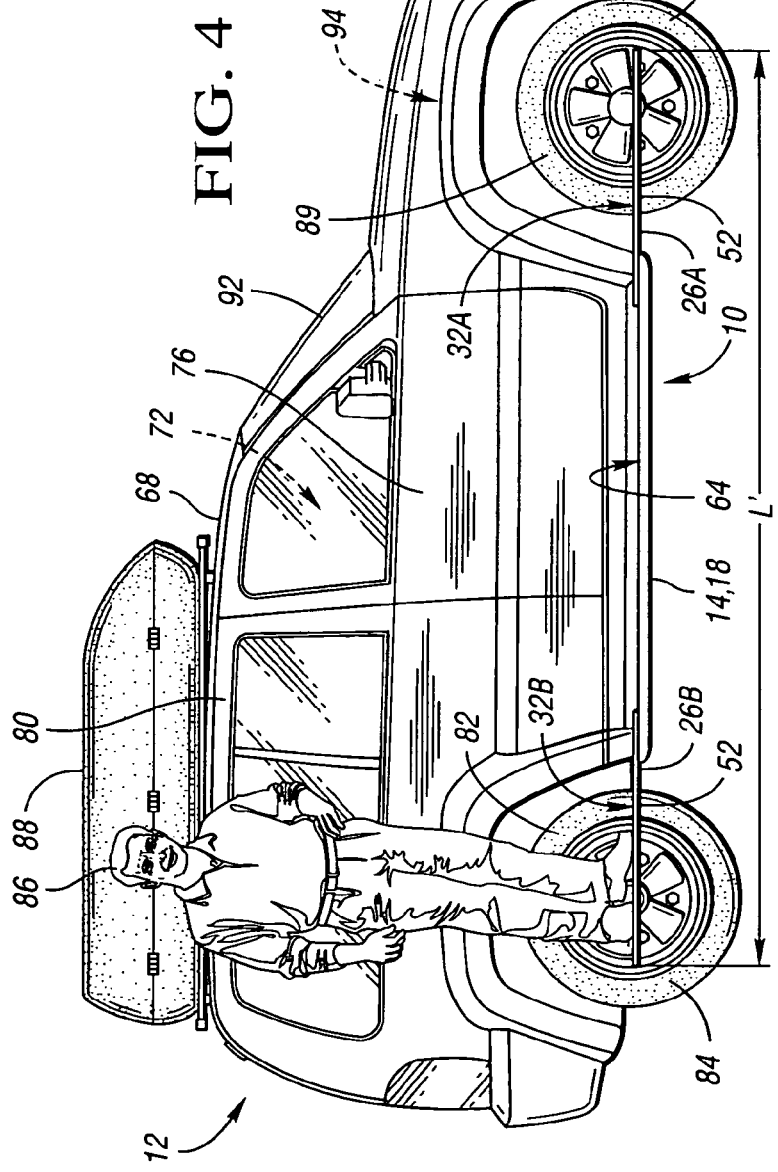
FIG. 4 is a schematic side view of the step assembly and vehicle body of FIG. 3, with movable members in extended positions.

Referring to FIG. 4, the movable members 26A, 26B are each depicted in respective extended positions such that the step assembly 10 is characterized by length L', which is greater than length L. Translation of the movable members may thus alter the length of the step assembly 10. At least a portion of movable member 26B extends rearward of at least a portion 82 of rear wheel 84 so that surface 32B is available as a stepping surface for a vehicle user 86 rearward of the rear door 80. For example, the vehicle user 86 may employ the surface 32B on a respective side of the vehicle to elevate himself to install or access a roof-mounted luggage carrier 88 as the configuration of the carrier requires. At least a portion of movable member 26A extends forward of at least a portion 89 of front wheel 90 so that surface 32A is available as a stepping surface for a vehicle user forward of the front door 76 to reach the windshield 92, engine compartment 94, etc. In the context of the present invention, a tire is considered part of a "wheel."

The upper surface 64 of the base member 14 is at least partially exposed and may be used as a base member stepping surface by a vehicle user entering or leaving the passenger compartment 72. Thus, the amount of available, exposed stepping surface 64, 32A, 32B increases when the movable members 26A, 26B are in their respective extended positions.

Releasably engageable latching mechanisms (not shown) are preferably employed to retain the movable members 26A, 26B in their respective stowed positions when the vehicle is in operation. Similarly, releasably engageable latching mechanisms (not shown) are preferably employed to prevent movement of the movable members 26A, 26B from their respective extended positions when supporting a vehicle user. Those skilled in the art will recognize a variety of suitable latching mechanisms. For example, a hole in the slider rail of one of the movable members may align with a spring-biased pin on the track when the movable member is in its stowed position, resulting in the pin extending into the hole and preventing translation of the movable member. A user may disengage the pin by overcoming the spring bias.

Referring to FIG. 5, wherein like reference numbers refer to like components from FIGS. 1–4, a portion of an alternative step assembly 10' configuration is schematically depicted. A movable member 26A' is pivotably mounted to base member 14' by a pivot pin 96. Thus, the movable member 26A' is pivotably repositionable fore and aft between a stowed position and an extended position to alter the length of the step assembly 10'.

In each of the embodiments shown in FIGS. 2 and 5, the potential load on the movable members must be considered so that the base and movable members, and their respective connections with each other, will be sufficiently strong to support the load. It may be desirable to provide a support surface for the movable members in their extended positions. Commonly assigned application Ser. No. 10/132,778, filed Apr. 25, 2002, is hereby incorporated by reference and describes a stepping surface that is mounted at a wheel hub and selectively extendable and stowable. It may be desirable to employ wheel hub stepping surfaces in combination with the step assembly of the present application such that each wheel hub stepping surface at least partially supports one of the movable members in its extended position.

While the best modes for carrying out the invention have been described in detail, those familiar with the art to which this invention relates will recognize various alternative designs and embodiments for practicing the invention within the scope of the appended claims.

The invention claimed is:

1. A step assembly for a vehicle, the step assembly comprising:
   a base member mountable with respect to the vehicle and having a base member stepping surface; and
   at least one movable member being selectively repositionable fore and aft with respect to the base member such that the length of the step assembly is selectively variable, said at least one movable member having a movable member stepping surface.

2. The step assembly of claim 1, wherein said at least one movable member is translatable with respect to the base member.

3. The step assembly of claim 2, further comprising a track with which said at least one movable member is operatively engaged such that the track guides said at least one movable member during translation.

4. The step assembly of claim 3, wherein the track is on the base member.

5. The step assembly of claim 1, wherein said at least one movable member is pivotable with respect to the base member.

6. A vehicle comprising:
   a vehicle body;
   a step assembly operatively connected to the vehicle body and including a base member defining a base member stepping surface, and at least one movable member defining a movable member stepping surface and being selectively repositionable fore and aft with respect to the vehicle body.

7. The vehicle of claim 6, wherein said at least one movable member is translatable with respect to the base member.

8. The vehicle of claim 7, further comprising a track with which said at least one movable member is operatively engaged such that the track guides said at least one movable member during translation.

9. The vehicle of claim 8, wherein the track is on the base member.

10. The vehicle of claim 6, wherein said at least one movable member is pivotable with respect to the base member.

11. The vehicle of claim 6, wherein the vehicle further comprises a rear wheel; wherein said at least one movable member is movable between a stowed position in which said at least one movable member does not extend rearward of any portion of the rear wheel, and an extended position in which said at least one movable member extends rearward of at least a portion of the rear wheel.

12. The vehicle of claim 6, wherein the vehicle further comprises a front wheel; wherein said at least one movable member is movable between a stowed position in which said at least one movable member does not extend forward of any portion of the front wheel, and an extended position in which said at least one movable member extends forward of at least a portion of the front wheel.

13. A vehicle comprising:

a vehicle body; a front wheel; a rear wheel; and a step assembly including a base member having a base member stepping surface, a track, a first movable member, and a second movable member, the first and second movable members each having a movable member stepping surface and being operatively engaged with the track for translation fore and aft with respect to the vehicle body along the track;

wherein the first movable member is translatable between a stowed position in which the first movable member does not extend rearward of any portion of the rear wheel, and an extended position in which the first movable member extends rearward of at least a portion of the rear wheel;

wherein the second movable member is translatable between a stowed position in which the second movable member does not extend forward of any portion of the front wheel, and an extended position in which the second movable member extends forward of at least a portion of the front wheel.

14. The vehicle of claim 6, wherein said vehicle body includes at least one side door, and wherein said base member and said at least one movable member are positioned at a height lower than said at least one side door.

15. The vehicle of claim 6, further comprising a front wheel and a rear wheel; wherein the base member is rigidly mounted with respect to the vehicle body such that the base member does not extend forward of any part of the front wheel and does not extend rearward of any part of the rear wheel.

* * * * *